April 13, 1926.
N. L. PATTERSON
1,580,675
CHART FOR TEACHING PENMANSHIP
Filed Jan. 31, 1925
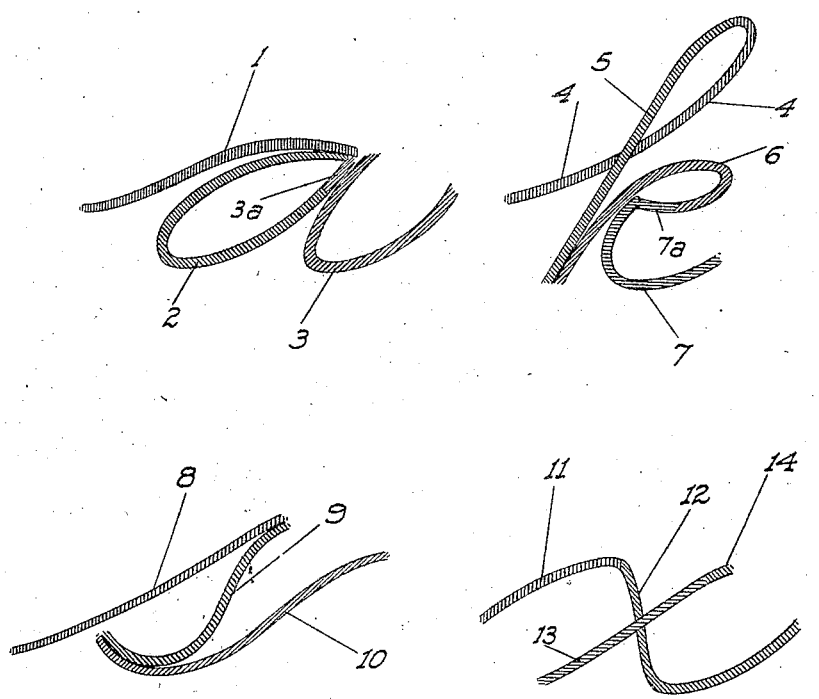
INVENTOR
Nina L. Patterson
BY
ATTORNEY Patented Apr. 13, 1926.

1,580,675

UNITED STATES PATENT OFFICE.

NINA L. PATTERSON, OF HARMONY, CALIFORNIA.

CHART FOR TEACHING PENMANSHIP.

Application filed January 31, 1925. Serial No. 5,985.

*To all whom it may concern:*

Be it known that I, NINA L. PATTERSON, a citizen of the United States, residing at Harmony, county of San Luis Obispo, State of California, have invented certain new and useful Improvements in Charts for Teaching Penmanship; and I do declare the following to be a full, clear, and exact description of the same, reference being had to the accompanying drawings, and to the characters of reference marked thereon, which form a part of this application.

This invention relates to a method of teaching penmanship to beginners, my principal object being to provide a scientific method particularly intended to teach pupils to learn how to start and follow through the different strokes of the letters in proper sequence, while at the same time they will acquire a knowledge of letter-form.

To those who can write, whether they are what is known as good penmen or not, the actual formation or building up of the letters appears obvious, and from habit they form the letters in a certain manner, which may or may not be correct.

I have found from experience, however, that beginners having no foundation from which to start, have no definite idea from which end of the letter to begin in attempting to write the same.

It is therefore the main object of my invention, as above stated, to teach the pupils to form their letters by starting at a predetermined point of a letter stroke and following up the starting stroke with the remainder in the proper sequence to form a completed letter.

Roughly my method consists in providing, preferably in copybook form, the letters of the alphabet, both capitals and small or lower-case letters, as well as the different numerals and various other characters, printed with the different strokes in different colors, all the corresponding strokes in the different letters having the same color.

The purpose of this delineation of the letters will now be described more in detail.

The accompanying drawing illustrates a few typical lower-case letters of the alphabet, in which the different strokes are represented in different colors.

These colors are of any desired shades and are chosen arbitrarily, the only requirement being that the same colors be adhered to for representing corresponding letter-strokes throughout the alphabet, and that the colors shall be of such contrasting nature that there is no danger of two colors being confused by the pupil.

Referring more particularly to the drawing the letter "a" for example may be considered as having three strokes, 1, 2 and 3, the strokes to be made by the writer beginning at the lower end of the stroke 1, along said stroke 1 until it merges with stroke 2, then along stroke 2 to its end where it in turn merges with the stroke 3, and then along 3 to its outer end. This is the correct method of forming this letter, as is well known to any penmanship instructor. In this instance red, green and brown have been arbitrarily selected for the colors of strokes 1, 2 and 3 respectively.

It will be noted that the color indicating the actual third stroke follows down along the adjacent portion of the 2nd stroke somewhat, as at $3^a$. This is to avoid the possibility of the pupil, when reaching the upper end of the first stroke, and not having a guide as to which way to turn, from then making the second stroke backwards, as he might do if this second stroke, being practically endless, were a single color from end to end.

The letter "k" may be considered as consisting of four strokes, 4, 5, 6, and 7, for the first three of which the same colors are used as for the letter "a" while for the fourth stroke an additional color, here represented as blue, is used. This letter is to be made by starting at the outer end of the first stroke 4 and following along the different strokes in proper sequence, as is well known.

With this letter also, the fourth stroke color follows along the adjacent portion of the third stroke 6, as shown at $7^a$. This is done to avoid the possibility of the pupil from turning to the right instead of going on up when tracing the stroke 6 from the bottom and arriving at the junction of the tail end portion of said stroke with the first or upwardly extending portion of the stroke.

The letter "s" may be considered as having three strokes, 8, 9 and 10 colored as the strokes 1, 2, and 3 of the letter "a", and in the same order.

The letters above illustrated are typical of those which are made without necessarily lifting the pen or the pencil from the paper, although the different strokes are here shown as separated lines.

This arrangement could be used for absolute beginners, and when they had learned the most rudimentary features as to direction of the strokes, etc. they would then be put on exercises in which the strokes were shown combined as usual and the letters intended to be made by properly retracing portions of the strokes.

In letters such as "x", however, the pen must perforce be lifted to make the diagonal line or stroke. This letter I have illustrated as having three strokes, 11, 12 and 13, though 11 and 12 may be considered as a single stroke, if desired, and which is optional with the instructor. In this case the pen follows from the lower end of stroke 11 through to the outer end of the stroke 12 without a pause or break, but must then be lifted to make the stroke 13. The starting end of the stroke 13, which is the upper end thereof, is therefore colored the same as the second stroke 12, as indicated at 14, so that the pupil will have a guide as to the direction to follow in making the last stroke.

In teaching penmanship by my method each pupil is preferably given a copy-book with the full alphabet and other characters printed therein in the desired colors, these letters being traced by the pupil with a pen or pencil.

The teacher then orally instructs the pupils as to the meaning or value of the different colors and their relation to the direction of movement of the pen necessary to properly form the letter. For instance red, as illustrated here, would be emphasized as being in all cases the color of the stroke with which each letter is to be started, or the starting stroke.

The instructor would also emphasize the fact that this starting stroke is to be followed along from its outer end toward the next stroke for its full length, or until another color is reached, and then said other color which indicates the second stroke is to be similarly followed until the next color is reached and so on to the end of the letter, no matter if one of these strokes crosses or is crossed by another one, as for instance the strokes 4 and 5 in the letter "k". In other words, a color is never to be left or the pen or pencil lifted therefrom until the entire length of this color has been traversed.

When the pupil has acquired a slight knowledge of writing by the above method exercises may, if desired, be given in letter-forming with the use of the starting-stroke color alone as a guide. In this manner the pupil is taught by means of colors, which any child of school age will recognize after once seeing the same, which stroke of the letter to start with and which strokes or lines to follow in sequence after the starting stroke. The pupil will therefore not form the habit sometimes acquired by beginners of writing a letter backwards or adding what should be the starting stroke as a "tail" after the remainder of the letter has been made.

This method may of course be successfully employed regardless of whether the vertical, slanting, or any other style of penmanship is being taught.

Though I have specified the letters as being written in copybooks, cards might be used instead of or supplementary to the books.

My method permits of seat practice without the teacher's supervision or board exercises may be given if preferred.

Having thus described my invention what I claim as new and useful and desire to secure by Letters Patent is:

A penmanship chart comprising letters having the different stroke lines displayed in relatively different colors, the ends of certain stroke lines for a limited distance being the same color as the next succeeding stroke lines to indicate the proper beginnings and terminals of the stroke lines so designated.

In testimony whereof I affix my signature.

NINA L. PATTERSON.